(12) United States Patent
Duncan et al.

(10) Patent No.: US 9,295,192 B2
(45) Date of Patent: Mar. 29, 2016

(54) AGRICULTURAL ACCESS SYSTEMS AND METHODS

(71) Applicant: Elwha LLC, Bellevue, WA (US)

(72) Inventors: William David Duncan, Kirkland, WA (US); Roderick A. Hyde, Redmond, WA (US); Lowell L. Wood, Jr., Bellevue, WA (US)

(73) Assignee: ELWHA LLC, Bellevue, WA (US)

( * ) Notice: Subject to any disclaimer, the term of this patent is extended or adjusted under 35 U.S.C. 154(b) by 114 days.

(21) Appl. No.: 14/061,574

(22) Filed: Oct. 23, 2013

(65) Prior Publication Data

US 2015/0108320 A1    Apr. 23, 2015

(51) Int. Cl.
| | |
|---|---|
| *F16M 13/00* | (2006.01) |
| *A01C 23/00* | (2006.01) |
| *F16M 11/18* | (2006.01) |
| *F16M 11/42* | (2006.01) |
| *A01M 7/00* | (2006.01) |
| *A01C 23/04* | (2006.01) |

(52) U.S. Cl.
CPC ............... *A01C 23/00* (2013.01); *A01M 7/00* (2013.01); *F16M 11/18* (2013.01); *F16M 11/425* (2013.01); *A01C 23/04* (2013.01)

(58) Field of Classification Search
CPC ..... F16M 13/022; A01C 23/00; A01C 23/003; A01C 23/005; A01G 25/00
USPC ........................................................ 248/550
See application file for complete search history.

(56) References Cited

U.S. PATENT DOCUMENTS

| | | | | |
|---|---|---|---|---|
| 3,186,493 | A * | 6/1965 | Barry ............................. | 172/26 |
| 3,305,113 | A * | 2/1967 | Gardner ........................ | 414/508 |
| 3,653,150 | A * | 4/1972 | Howard ......................... | 47/22.1 |
| 4,704,851 | A * | 11/1987 | Manor ........................ | 56/340.1 |
| 2002/0008167 | A1* | 1/2002 | Haberland et al. ............ | 239/722 |
| 2012/0067441 | A1* | 3/2012 | Korus et al. ............... | 137/561 R |
| 2012/0186213 | A1* | 7/2012 | Orlando et al. ................ | 56/13.5 |
| 2012/0279731 | A1* | 11/2012 | Howard, Sr. ..................... | 169/52 |
| 2014/0137472 | A1* | 5/2014 | Anderson et al. ............. | 47/62 A |
| 2014/0311030 | A1* | 10/2014 | Anderson et al. ............. | 47/62 A |

* cited by examiner

*Primary Examiner* — Mark Wendell

(57) ABSTRACT

An agricultural access system is described. The system may utilize a plurality of supports, including posts, cables, beams, and so forth to displace an access component. Control systems, sensors, delivery mechanisms, and other functions may be integrated with the system or access components. Some embodiments may include multiple cells with access components configured to interact with adjacent access components. Methods of accessing an agricultural area are also disclosed.

29 Claims, 11 Drawing Sheets

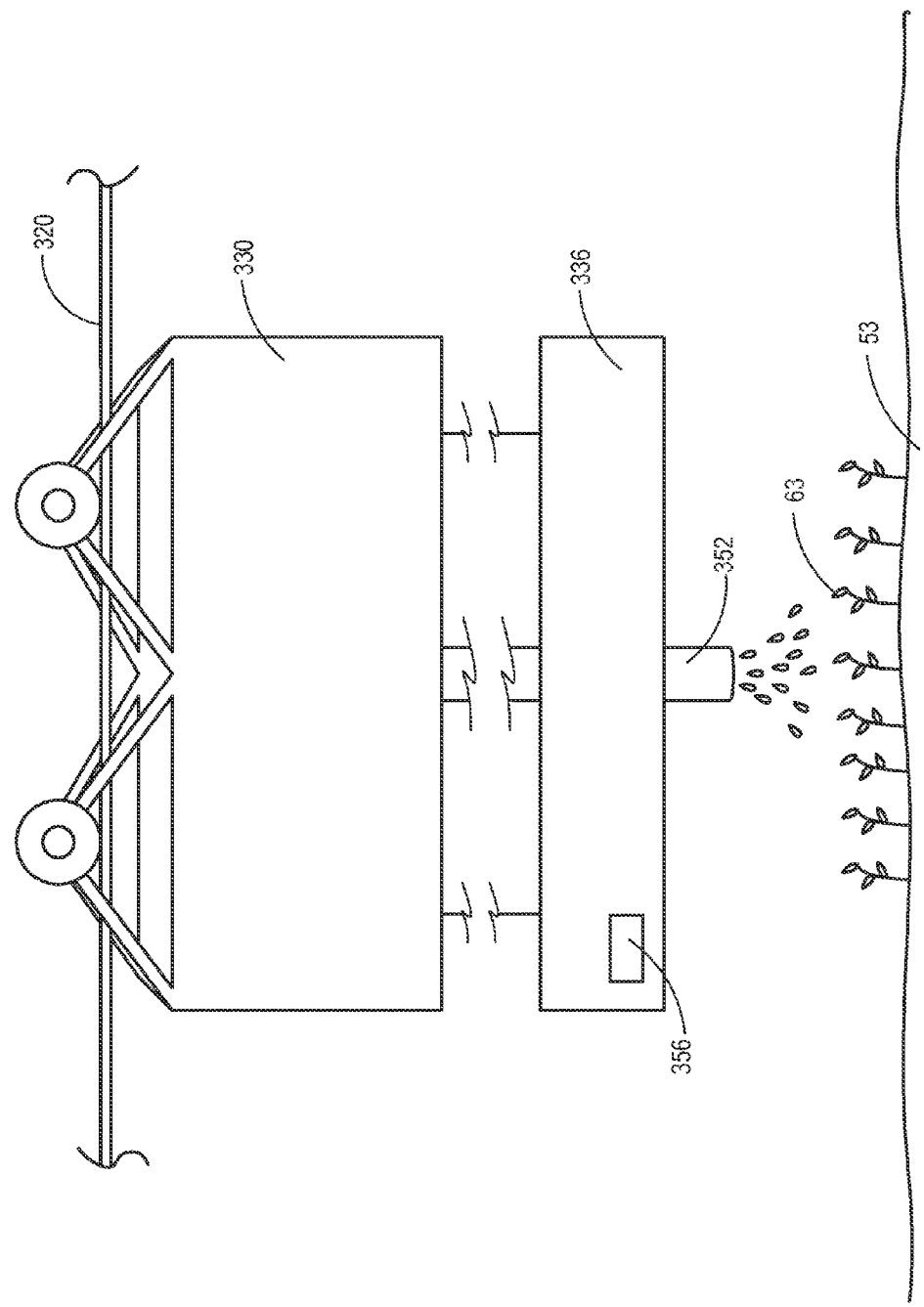

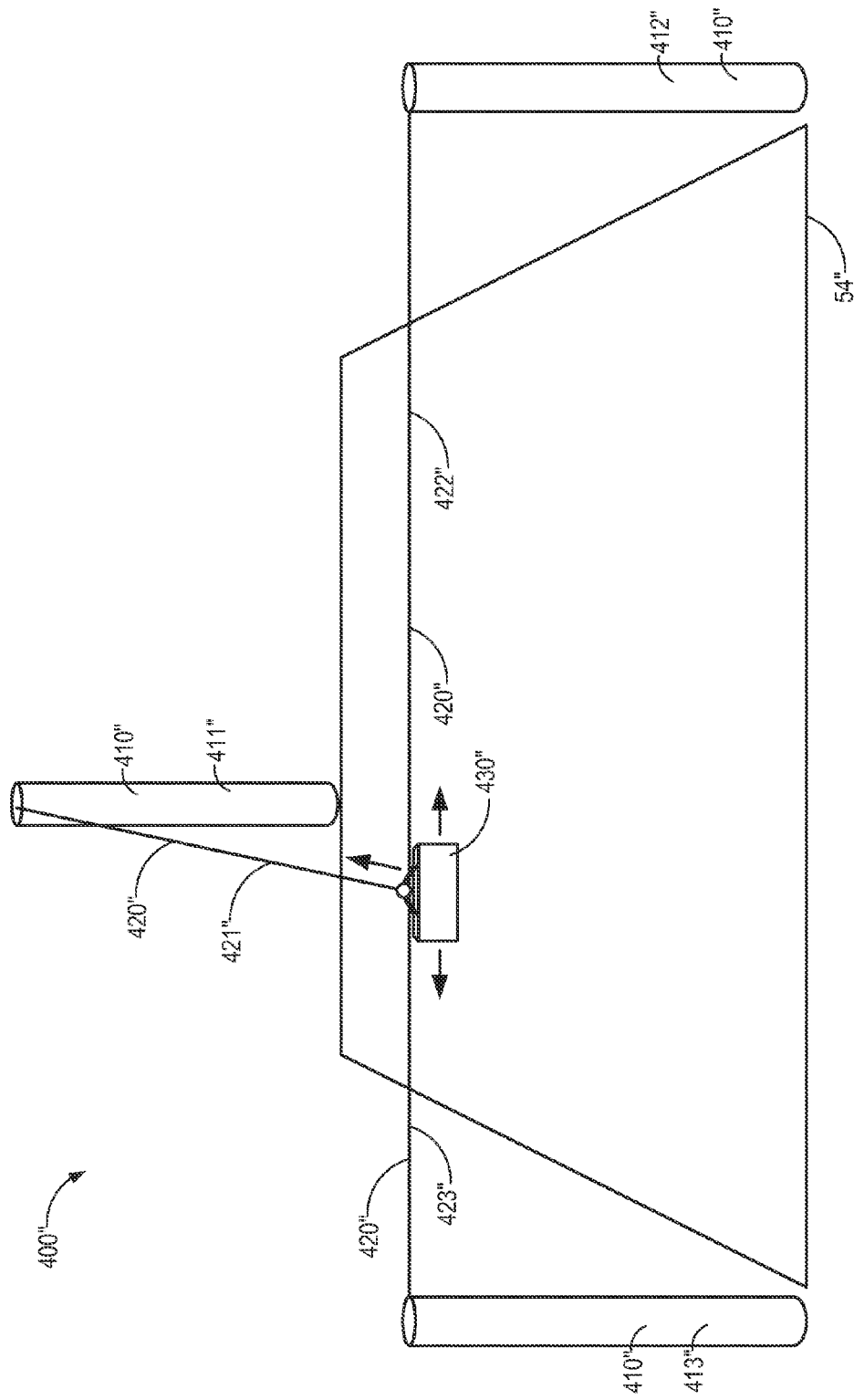

AGRICULTURAL ACCESS SYSTEMS AND METHODS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

None

RELATED APPLICATIONS

U.S. patent application Ser. No. 14/061,569, entitled AGRICULTURAL ACCESS SYSTEMS AND METHODS, naming William David Duncan, Roderick A. Hyde, and Lowell L. Wood, Jr. as inventors, filed Oct. 23, 2013, is related to the present application.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

TECHNICAL FIELD

The present disclosure relates generally to agricultural access systems. Agricultural access systems may be configured to deliver materials and/or otherwise interact with portions of an agricultural field. The systems may be remotely controlled and may be configured to access the field from above.

BRIEF DESCRIPTION OF THE DRAWINGS

The embodiments disclosed herein will become more fully apparent from the following description and appended claims, taken in conjunction with the accompanying drawings. The drawings depict exemplary embodiments of the present disclosure. Various features of these embodiments will be described with additional specificity and detail through reference to the drawings, in which:

FIG. 5 is a schematic view of an access component of the agricultural access system of FIG. 4.

FIG. 6C is a schematic view of another embodiment of an agricultural access system having three vertical support members.

DETAILED DESCRIPTION

Agricultural access systems may be configured to access various portions of an agricultural field while minimizing interaction of the system with the field. For example, an access system may be configured to access the field from above, limiting contact between the system and the field. Vertical support components may be positioned around the perimeter of the field, facilitating control over which portions of the field are contacted by the access system.

An agricultural access system may further be configured for remote control or may be controlled by an automated or partially automated control system. The system may be configured to facilitate certain interactions with the field (delivery of materials such as pesticides) while limiting unwanted disturbance of the field. Further, the access system may be configured to access certain portions of the field, delivering materials only to specific targets within the field.

An agricultural access system configured for overhead access may utilize cable systems, pulleys, winches, booms, and so forth to facilitate access while limiting interaction with the field or limiting contact with specific areas of the field. Such systems may be configured to deliver materials or otherwise interact with the agricultural field based on input from sensors configured to monitor conditions within the field.

An access system may be configured with movable support posts in some instances. Further, certain access systems may comprise multiple cooperating components, such as multiple access components disposed in adjacent cells or portions.

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the disclosure, but is merely representative of various embodiments. While the various aspects of the embodiments are presented in drawings, the drawings are not necessarily drawn to scale unless specifically indicated.

The phrases "connected to," "coupled to," and "in communication with" refer to any form of interaction between two or more entities, including mechanical, electrical, magnetic, electromagnetic, fluid, and thermal interaction. Two components may be coupled to each other even though they are not in direct contact with each other. For example, two components may be coupled to each other through an intermediate component.

Figure 1:
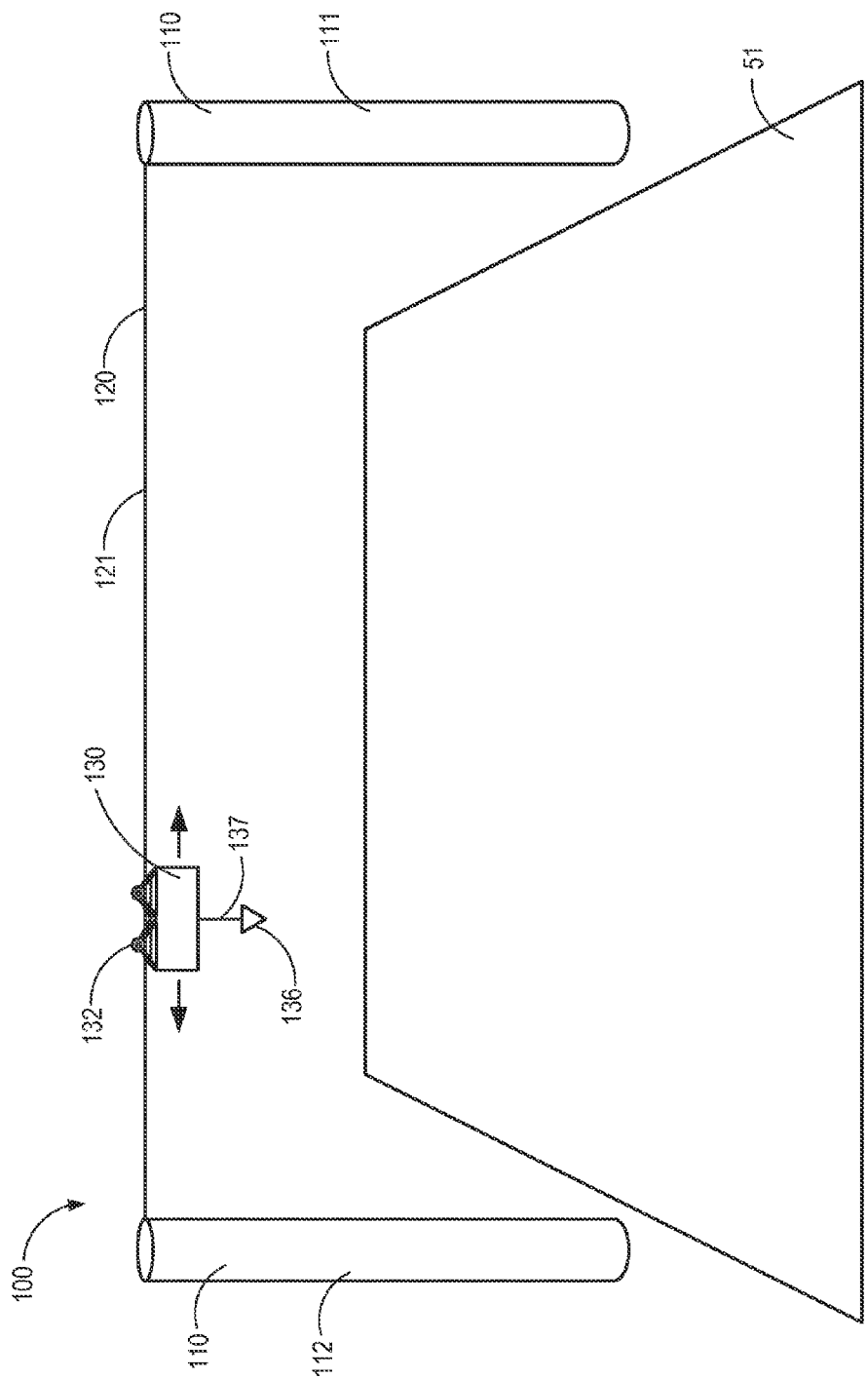
FIG. 1 is a schematic view of an embodiment of an agricultural access system having two vertical support members.

FIG. 1 is a schematic view of an embodiment of an agricultural access system 100 having two vertical support members 111, 112. The illustrated embodiment further comprises an elevated lateral support member 121. In the illustrated embodiment, the vertical support members are collectively designated with the reference numeral 110, while specific vertical support members are designated as consecutive numerals following the general reference numeral. Thus, reference numeral 110 designates the plurality of vertical support members, or the vertical support members generally, while the first vertical support and second vertical support of the illustrated embodiment are each designated by the specific reference numerals 111 and 112, respectively. Likewise, the reference numeral 120 designates elevated lateral support members within the illustration, while the first elevated lateral support is specifically designated 121 in the illustrated embodiment. (Note: In the embodiment of FIG. 1, there is only one elevated lateral support, 121.) This pattern continues throughout this disclosure, though subsequent embodiments differ from the present embodiment by incrementing the first digit of the reference numeral by 1.

In the embodiment of FIG. 1, the first vertical support member 111 and second vertical support member 112 are fixed to the ground around the perimeter of an agricultural field 51. In other embodiments, one or both of the vertical support members may be located within the agricultural field. The elevated lateral support 121 extends between the first 111 and second 112 vertical support members. An access component 130 is disposed on the elevated lateral support 121.

As indicated by the arrows in the illustrated embodiment, the access component 130 may be displaceable along the elevated lateral support member 121. Thus, the access component may be configured to access various portions of the agricultural field 51 between the first 111 and second 112 vertical support members.

The vertical support members 110 may comprise vertical posts or other components configured to support the elevated lateral support member 121 above the field 51. In some embodiments, one or more of the vertical support members 110 may comprise a naturally occurring feature such as a tree, boulder, or hill. The vertical support members 110 may be fixed to the ground by burying posts or setting them in concrete, or may be fixed to the ground in the sense that they rest upon the ground and are not configured to readily move (for example the vertical support members 110 may comprise collapsible tripods). In another embodiment, agricultural field 51 may have a plurality of pre-emplaced support pads located around its perimeter, each of which provides an anchor point for vertical support members 110; in operation, vertical support members 110 may be attached to a desired subset of the support pads, thereby allowing coupled access components to access various portions of the agricultural field 51. Thus, the system 100 may be permanently installed or configured to be set up for use, then removed or reconfigured following use.

The elevated lateral support member 121 may extend between the vertical support members 110. The elevated lateral support member 121 may comprise a cable extending between vertical support members 110 or may comprise a rigid member such as a beam. In some instances, a rigid elevated lateral support member may be coupled to only one vertical support member. In such embodiments, the elevated lateral support member may be configured to pivot with respect to the coupled vertical support member, allowing the elevated lateral support member to operate as a boom.

The elevated lateral support member 121 may be fixed at one or both ends with respect to the vertical support members 110 or may be displaceable at one or both ends. For example, in some embodiments the elevated lateral support member 121 may be configured to move vertically along the vertical support members 110. In such embodiments, the vertical distance between the elevated lateral support member 121 and the field 51 may be adjusted or controlled based on the position of the elevated lateral support member 121 on the vertical support members 110.

The access component 130 may again be displaceable along the elevated lateral support member 121. Varying the position of the access component 130 along the elevated vertical support member 121 as well as varying the position of the elevated lateral support member 121 with respect to the vertical support members 110 may thus allow the access component 130 to be positioned at any vertical or horizontal position between the vertical support members 110. In other words, the access component 130 may be displaceable to any point in a plane extending between the vertical support members 110.

The access component 130 may further comprise a coupling portion 132 configured to couple the access component 130 to the elevated lateral support member 121 and an extension portion 136 configured to extend from the coupling portion 132. The extension portion 136 may be displaceable with respect to the coupling portion 132. For example, the extension portion 136 may be configured to extend between the coupling portion 132 and the field 51. In some embodiments, the elevated lateral support member 121 may be fixed with respect to the vertical support members 110 and vertical displacement of the access component 130 may be solely tied to displacement of the extension portion 136 of the access component 130. In other embodiments, a combination of vertical displacement of the elevated lateral support member 121 and the extension portion 136 may be configured to control the position of the access component 130.

The extension portion 136 of access component 130 may be coupled to the coupling portion 132 by a vertical access member 137. The vertical access member 137 may be rigid or flexible and may be configured to extend vertically above and/or vertically below the coupling portion 132. The vertical access member 137 may comprise both flexible and rigid segments disposed adjacent each other, such as in series. The vertical access member 137 may be configured to extend at an angle with respect to the coupling portion 132. In some embodiments, the vertical access member 137 may comprise a generally flexible member and the extension portion 136 may be displaced by gravity as the vertical access member 137 is lengthened or shortened.

The access component 130 may be configured to monitor conditions on the field 51 (for example through sensors mounted on the access component 130) or may be configured to directly interact with the field 51 in a variety of ways (for example, delivering pesticides to particular portions of the field 51).

As used herein, the field of motion of the access component 130 refers to the space in which the access component 130 may be positioned by the system 100, including space accessible by any portion of the access component 130, such as the extension portion 136. Thus, in an embodiment wherein the access component 130 was displaceable along the elevated lateral support 121, but neither the access component 130 nor elevated lateral support 121 was vertically displaceable, the field of motion would extend along a substantially linear path in the direction of the elevated lateral support member 121. In the illustrated embodiment of FIG. 1, the field of motion of the access component 130 may comprise a plane extending between the vertical support members 110, as the extension portion 136 of the access component 130 is vertically displaceable from the linear path of the elevated lateral support member 121. In embodiments wherein the access component is also displaceable in a direction out of the plane (for example embodiments with additional vertical support members), the field of motion may comprise a three-dimensional space, bordered or defined by various components of the system 100.

As used herein, the field of regard of the access component 130 refers to an area or space wherein the access component 130 can sense conditions or otherwise interact with the space. Thus, the field of regard of the access component 130 may be more extensive than the field of motion of the access component 130. For example, the access component 130 may be configured to sense conditions, or deliver materials (such as through spraying), to areas outside its field of motion. The field of motion and the field of regard may each comprise a three-dimensional space in some embodiments.

Figure 2:
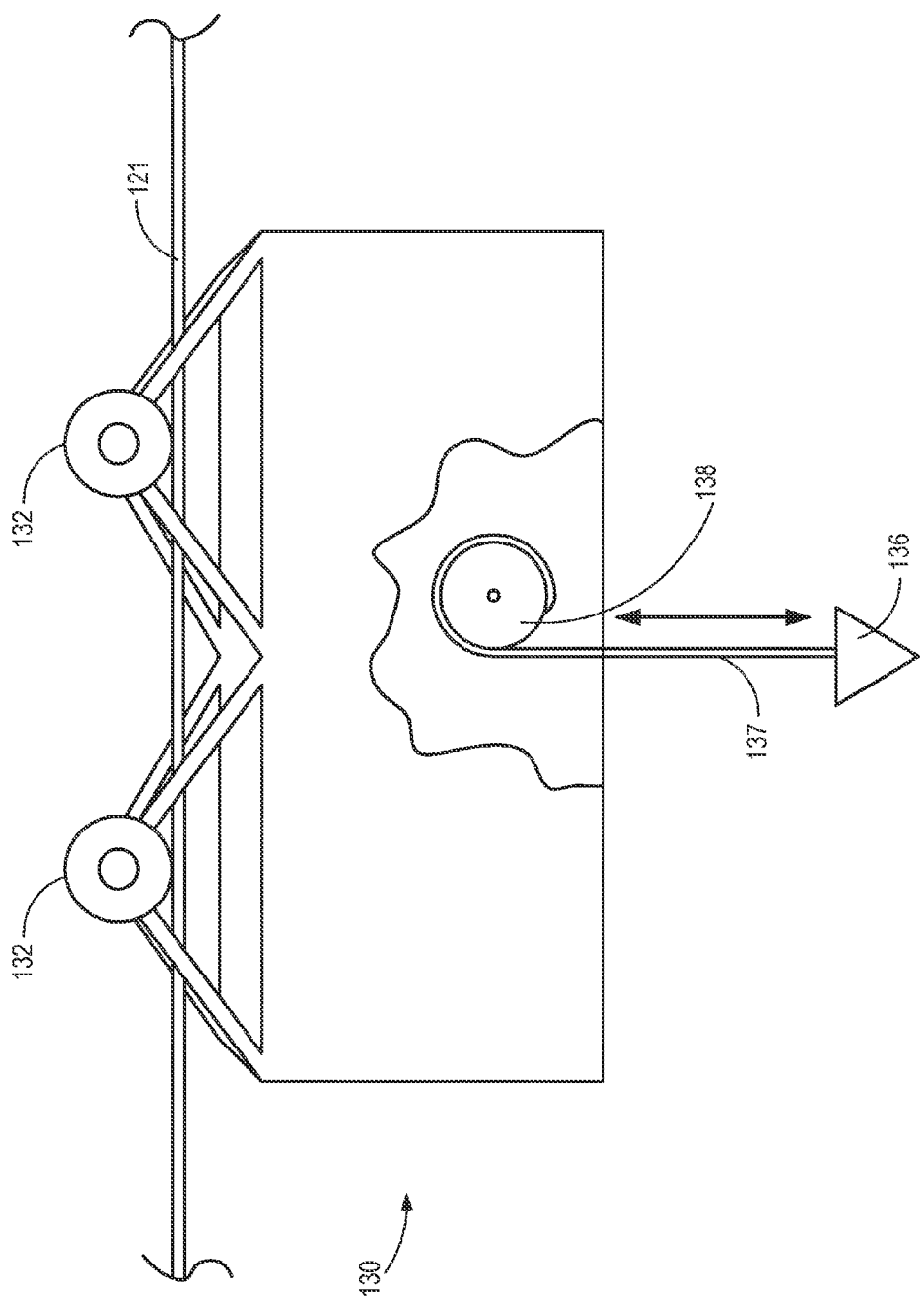
FIG. 2 is a schematic view of an access component of the agricultural access system of FIG. 1.

FIG. 2 is a more detailed schematic view of the access component 130 of the agricultural access system 100 of FIG. 1. In the view of FIG. 2, the access component 130 is shown along with the coupling portion 132 and extension portion 136 of the access component 130. A portion of the elevated lateral support member 121 is also shown.

Further, as shown in the cutaway portion, the access component 130 of the illustrated embodiment further comprises a winch 138 operatively coupled to the vertical access member 137. In the illustrated embodiment the vertical access member 137 comprises a flexible cable which is operatively coupled to the winch 138. Rotational displacement of the winch 138, together with the force of gravity acting on the extension portion 136, may thus control the vertical position of the extension portion 136 with respect to the coupling portion 132.

The access component 130 may be displaceable along the elevated lateral support member 121. In some instances, horizontal displacement of the access component 130, or displacement above the ground in a plane orthogonal to the vertical direction, may be related to translation of the access component 130 in the direction of the elevated lateral support member 121. Further, in some embodiments, the elevated lateral support member 121 may comprise a continuous cable and the access component 130 may be configured to move along the continuous cable. A propulsion system may be configured to displace the access component 130 along the elevated lateral support member 121. In some instances, for example, the coupling portion 132 may comprise one or more motors configured to move the access component 130 along the elevated vertical support member 121. Embodiments comprising gears, sprockets, chains, and so forth are likewise within the scope of this disclosure. In other embodiments, the coupling portion 132 may comprise pulleys or wheels configured to freely move along the elevated vertical support member 121. In such embodiments, the force to displace the access component 130 may be supplied by additional components (such as one or more tension cables coupled to the access component). Still further, the access component 130 may be fixed to the elevated lateral support member 121 and lateral displacement of the elevated lateral support member 121 may be configured to displace the access component 130.

Figure 3:
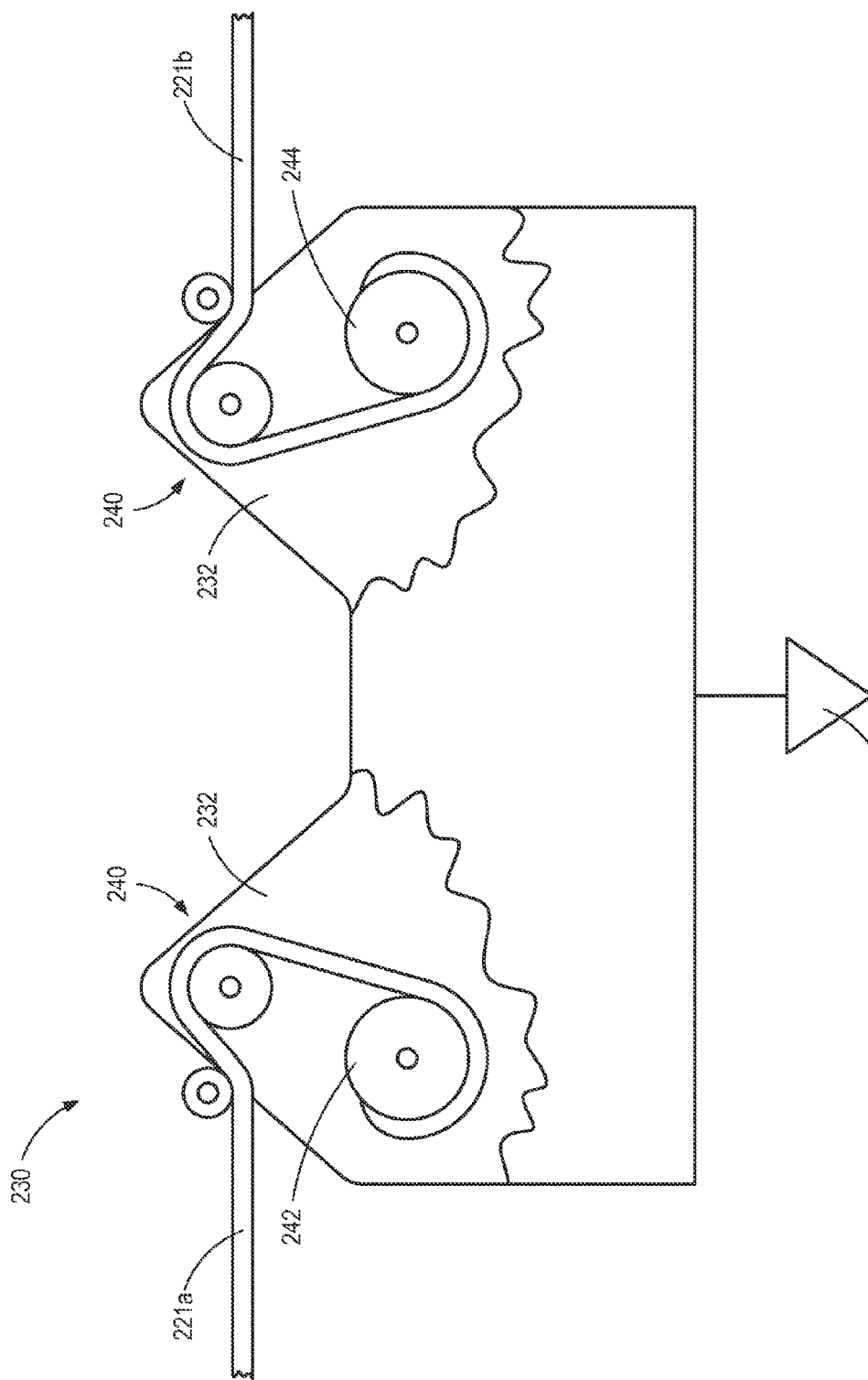
FIG. 3 is a schematic view of another embodiment of an access component.

FIG. 3 is a schematic view of another embodiment of an access component 230. The access component 230 of FIG. 3 may be used with any of the agricultural access systems disclosed herein. Further, the embodiment of FIG. 3 may include components that resemble components of the embodiment of FIGS. 1 and 2 in some respects. For example, the embodiment of FIG. 3 includes an access component 230 that may resemble the access component 130 of FIGS. 1 and 2. It will be appreciated that all the illustrated embodiments have analogous features and components. Accordingly, like or analogous features are designated with like reference numerals, with the leading digits incremented to "2." Relevant disclosure set forth above regarding similarly identified features thus may not be repeated hereafter. Moreover, specific features of the access member 230 and related components shown in FIG. 3 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the system and related components of FIG. 3. Any suitable combination of the features, and variations of the same, described with respect to the access component 130 illustrated in FIGS. 1 and 2 can be employed with the system and components of FIG. 3, and vice versa. This pattern of disclosure applies equally to further embodiments depicted in subsequent figures and described hereafter. Further, this pattern of disclosure applies generally to the various systems and related components disclosed herein, not just access components specifically. Thus, disclosure relative to any embodiment may be analogously applied to any other embodiment herein.

The agricultural access component 230 of FIG. 3 comprises a coupling portion 232 and an extension portion 236. As further detailed below, the access component 230 may comprise a propulsion system 240 configured to displace the access component 230 through cooperative interaction with portions of an elevated lateral support member 221a, 221b. In the embodiment of FIG. 3, the coupling portion 232 is coupled to the elevated lateral support member 221a, 221b. In the illustrated embodiment, the elevated lateral support member comprises two segments, a first segment 221a and a second segment 221b. In the illustrated embodiment, the first 221a and second 221b segments are not directly coupled to each other. Further, in the illustrated embodiment the first segment 221a of the elevated lateral support is coupled to a first reel 242 and the second segment 221b of the elevated lateral support is coupled to a second reel 244. Each of the first 221a and second 221b segments may also be coupled to another component, such as first and second vertical support members (not shown).

In embodiments wherein the first 221a and second 221b segments are fixed to another component (such as a vertical support member) rotational displacement of the first 242 and second 244 reels may be configured to displace the access component 230. For example, the first 242 and second 244 reels may cooperate such that the first reel 242 rotates to add slack to the first segment 221a of the elevated lateral support member while the second reel 244 rotates to take up slack on the second segment 221b of the elevated lateral support member. The reels 242, 244 may cooperate such that the entire elevated lateral support member 221a, 221b remains taut during this rotation and the access component is displaced in the direction in which the second segment 221b of the elevated lateral support extends from the access component 230.

In other embodiments, the first 221a and second 221b segments of the elevated lateral support may be fixed at the access component 230 and be coupled to reels at other locations, such as at the vertical support members or at the ground. For example, the first 221a or second 221b segment of the elevated lateral support may be fixed at the access component 230, run over a pulley on a vertical support member, and coupled to a reel, including a motorized reel, disposed on the ground. Any number of reels and/or pulleys may be used to alter the length of the segment extending from the access component 230 by taking up a portion of the segment on a reel. Again, cooperative adjustments to such segments may be configured to displace the access component 230 along the directions of the segments extending from the access component 230. Further, intermediate components may be disposed between the first 221a and second 221b segments of the elevated lateral support member and the access component 230, any vertical support members, the ground, or any other coupling location.

Figure 4:
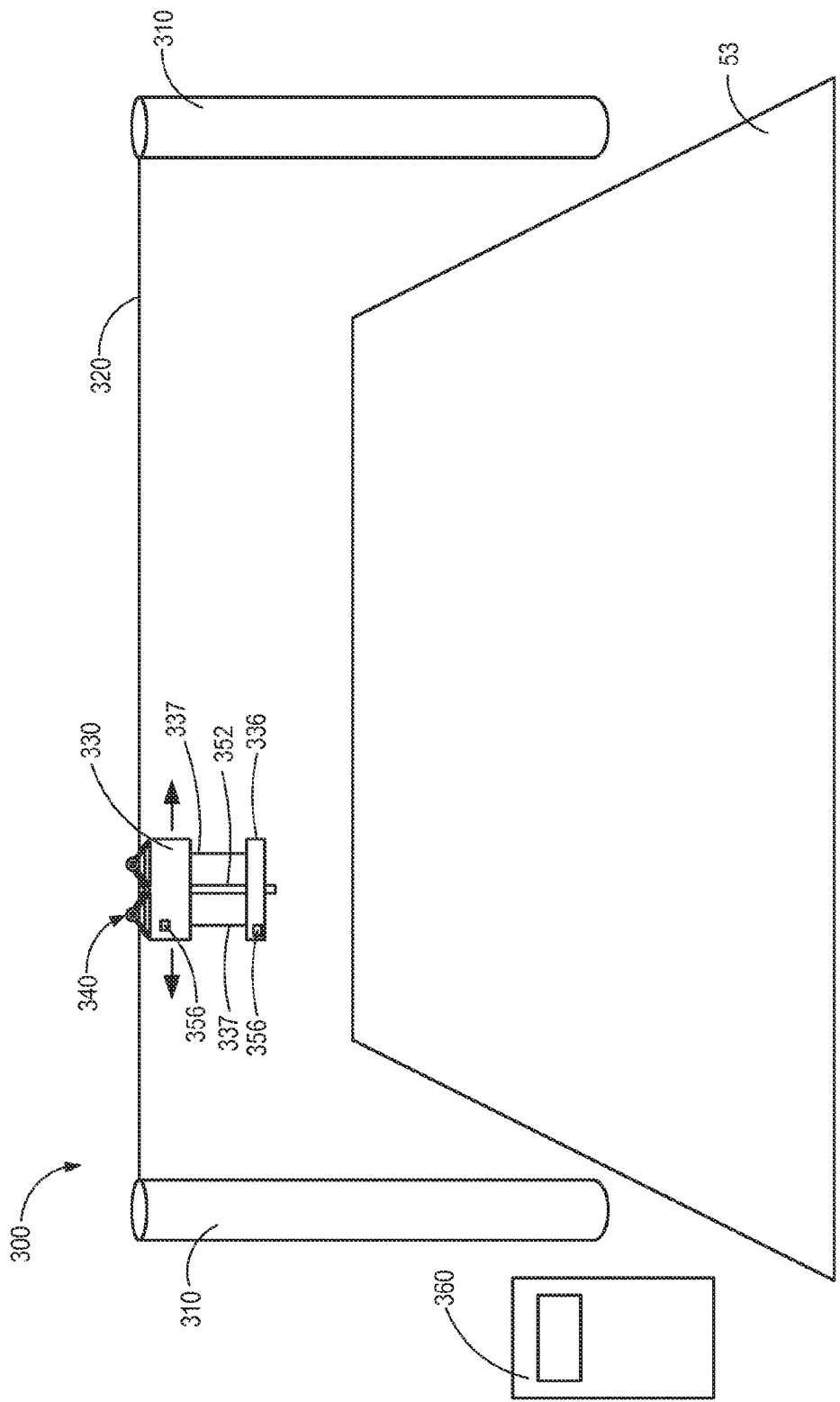
FIG. 4 is a schematic view of another embodiment of an agricultural access system having two vertical support members and a control system.

FIG. 4 is a schematic view of another embodiment of an agricultural access system 300 having two vertical support members 310 and a control system 360. The control system 360 may comprise a processor or another signal processing element. The control system 360 may be disposed adjacent the agricultural field 53 where the system 300 is deployed or may be disposed at a remote location. Further, the control system 360 may be positioned on or within any component of the agricultural access system 300, including embodiments wherein the control system 360 is disposed on board the agricultural access component 330.

The control system 360 may be configured to control the position of the access component 330 within the field of motion of the access component 330. For example, the control system 360 may interact with a propulsion system 340 configured to displace the access component 330 along the elevated lateral support 320. The control system 360 may also control the position of the extension portion 336 of the access component 330 by adjusting the vertical access member 337. Regardless of the mechanics by which the access component 330 is displaced (e.g., vertical displacement of the elevated lateral support member 320 along the vertical support members 310, manipulation of segments of the elevated lateral support member 320 extending from the access component, etc.) the control system 360 may be configured to control displacement of the access component 330. Any method of displacement disclosed herein may be used in connection to any control system 360 disclosed herein. Further, the control system 360 may be configured to simultaneously control various components of the system 300 to quickly and smoothly displace the access component 330 to any position within the field of motion of the access component 330.

The control system 360 may be programmed to control the position of the access component 330 according to a sequence of positions of the access component 330. For example, the control system 360 could be programmed to serially dispose the access component 330 over various sectors of the field 53, for example to deliver pesticides or other agents to those sectors. The control system 360 may further be configured to control the time at which the access component 330 is disposed at particular positions, for example by positioning the access component 330 at a predetermined location at the same time each day. Still further, the control system 360 may be configured to control the duration of time at which the access component 330 is disposed at a particular location or at various positions in a sequence of locations.

The access system 300 may further comprise one or more sensors 356. In the illustrated embodiment, sensors 356 are shown on the extension portion 336 of the access component 330 as well as on other locations on the access component 330. In other embodiments sensors 356 may be positioned on, or mechanically coupled to, any other component of the system 300, including, for example, vertical support members 310, elevated lateral support members 320, and so forth. Additionally or alternatively, sensors 356 may be disposed in other locations in or around the field 53, including on the ground, even if not abutting another component of the system 300.

The sensors 356 may be configured to provide input directly to the control system 360 or may be configured to provide data to a user who may then alter the control system 360. In some instances the control system 360 may be configured to automatically respond to sensor input. The sensors 356 may be connected to the control system 360, other sensors 356, or any user readout system through electrical connections, communications cables, wireless connections, and so forth. Thus the sensors 356 may be in communication with a transmitter configured to deliver data to an external component, including wireless transmitters. In some embodiments, the sensors 356 and related systems may be separate from the control system 360.

The sensors 356 may be configured to detect various conditions or features on the system itself 300 or conditions within the field of regard of the system 300. Again the field of regard may be coextensive with, or larger than, the field of motion of the access component 330 of the system 300. For example, the sensors 356 may be configured to monitor an area which is not identical to the field of motion of the access component. Various sensors 356 are within the scope of this disclosure. Exemplary sensor embodiments include, but are not limited to, cameras, spectrometers, moisture sensors, soil sensors, radar, lidar, and so forth. In some embodiments the access component 330 or other components may comprise an illumination component which may be used in connection with various sensors (e.g., cameras). The illumination component may provide spectral illumination, polarized illumination, pulsed illumination, nighttime illumination, focused illumination, directional illumination, or the like.

The control system 360 may be configured to communicate with components of the system 300 through electrical connections, communications cables (e.g., optical fibers, coaxial cable, etc.), wireless connections and so forth. For example, the control system 360 may communicate between a remote processing unit and a propulsion system or sensor on board the access component through a wireless connection.

The control system 360 may be configured to displace the access component 330 to automatically avoid obstacles within the field of motion of the access component 330. For example, the control system 360 could be programmed to avoid locations within the field of motion which contain particular features, such as avoiding certain plants or features when delivering a potentially harmful herbicide to other locations within the field of motion. The control system 360 may be configured to automatically detect and avoid obstacles such as rocks or trees within the field of motion. The control system 360 may further be configured to avoid collision between the access component 330 and moving obstacles, such as animals, people, or vehicles, within the field of motion.

In addition to other sensors described above, a GPS receiver may be incorporated into one or more components of the system 300 and may be used in connection with guidance of the access component 330 within the field of motion. Additionally, the access component 330 may comprise a receiver configured to receive various control and positioning instructions from the control system 360 or other inputs. The receiver may comprise a wireless receiver and/or may be coupled via a communications control cable.

The access component 330 may comprise various location determination components. Signals from these components may be fed into the control system 360 or other outputs. Again, a GPS receiver may comprise one such location determination component. Further, location determination components on the access component 330 may be configured to interact with other components such as external position references. For example, external cameras positioned within or around the field 53 may image the location determination component on the access component 330 and triangulate the position of the access component 330. Further, external transmitters may beam signals which are received by the location determination component to triangulate a position. Still further, the location determination component on the access component 330 may emit a signal which is processed by external receivers to determine a position. Various other location determination techniques are within the scope of this disclosure.

The control system 360 may also be configured to control various functions of the access component 330 or the system 300. For example, the access component 330 may be configured to deliver a material to locations within the field of regard or field of motion of the access component 330. In the illustrated embodiment, the access component 330 further comprises a conduit 352 which may be configured to deliver a material. In some embodiments, the material may be stored in a reservoir located on access component 330. In some embodiments, the material may be stored in a distal reservoir located elsewhere in the system 300 (e.g., attached to lateral support member 320, attached to vertical support member 310, located on an external vehicle, located on the ground, etc.). In such embodiments, conduit 352 may extend from the reservoir to access component 330, and may itself be coupled to lateral support member 320 or to vertical support member 310.

FIG. 5 is a schematic view of the access component 330 of the agricultural access system 300 of FIG. 4. In the configuration of FIG. 5, the extension portion 336 of the access component 330 is displaced from the elevated lateral support member 320 such that the extension portion 336 is disposed adjacent the field 53. Plants 63 within the field 53 are also shown as well as a sensor 356 on the extension portion 336.

As illustrated in FIG. 5, the conduit 352 may be used to deliver a material to the field. The conduit 352 may extend from other portions of the system 300 to direct the material. For example, the conduit 352 may extend to, and may be coupled to, a vertical support member (310 of FIG. 4) and/or a lateral support member 320 of the system. The conduit 352 may comprise flexible portions in some embodiments. Various conduits 352 configured to deliver material are within the scope of this disclosure, for example, pipes, tubes, channel, screw drives, and so forth. Conduit 352 may include a nozzle, a steerable portal, a metering system, etc.

The conduit 352 or other delivery system may be configured to deliver various materials. Exemplary materials within the scope of this disclosure include, but are not limited to, fertilizers, water, pesticides, plant hormones, herbicides, pollen, seeds, materials configured to be dispersed above the ground, materials configured to be delivered by penetrating the ground, and so forth.

The extension member 336, or another portion of the access component 330, may additionally or alternatively be configured to interact with the field 53 in various ways. For example, the extension member 336 may be configured to penetrate the ground. It may be configured to mechanically interact with the field 53 or plants 63 within the field 53. It may be configured to plant seeds, harvest plants or portions of plants, mechanically remove weeds or other unwanted plants, physically damage unwanted plants, and control vermin. The access component 330 may be configured to control vermin in a variety of ways, including by frightening vermin (e.g. via noise, lights, odors), mechanically removing vermin, poisoning vermin, and by shooting projectiles at vermin. The system may be configured to automatically sense any of these conditions or situations (e.g., need for water, herbicide, weed removal, vermin control, etc.) and automatically respond.

The access component 330 may further comprise a portion, such as the extension portion 336, configured to couple to one or more tools. One or more tools may be stored within the field of motion of the access component 330, such that the system can access and couple such tools as needed.

The access component 330 or other portions of the system may further be configured with dampening components to limit oscillations or other unwanted movement within the system. The dampening components may be actively controlled, for example by a sensor coupled to the control system (360 of FIG. 4).

Referring to FIGS. 4 and 5, the system 300 may further comprise a mobility system configured to control a transverse position of the access component 330 relative to the elevated lateral support member 320. The mobility system may control transverse motion of the elevated lateral support member 320 or transverse motion of the access component 330. The mobility system may further be configured to control a transverse oscillation of the vertical access member 337 coupling the extension portion 336 to the elevated lateral support member 320.

Figure 6A:
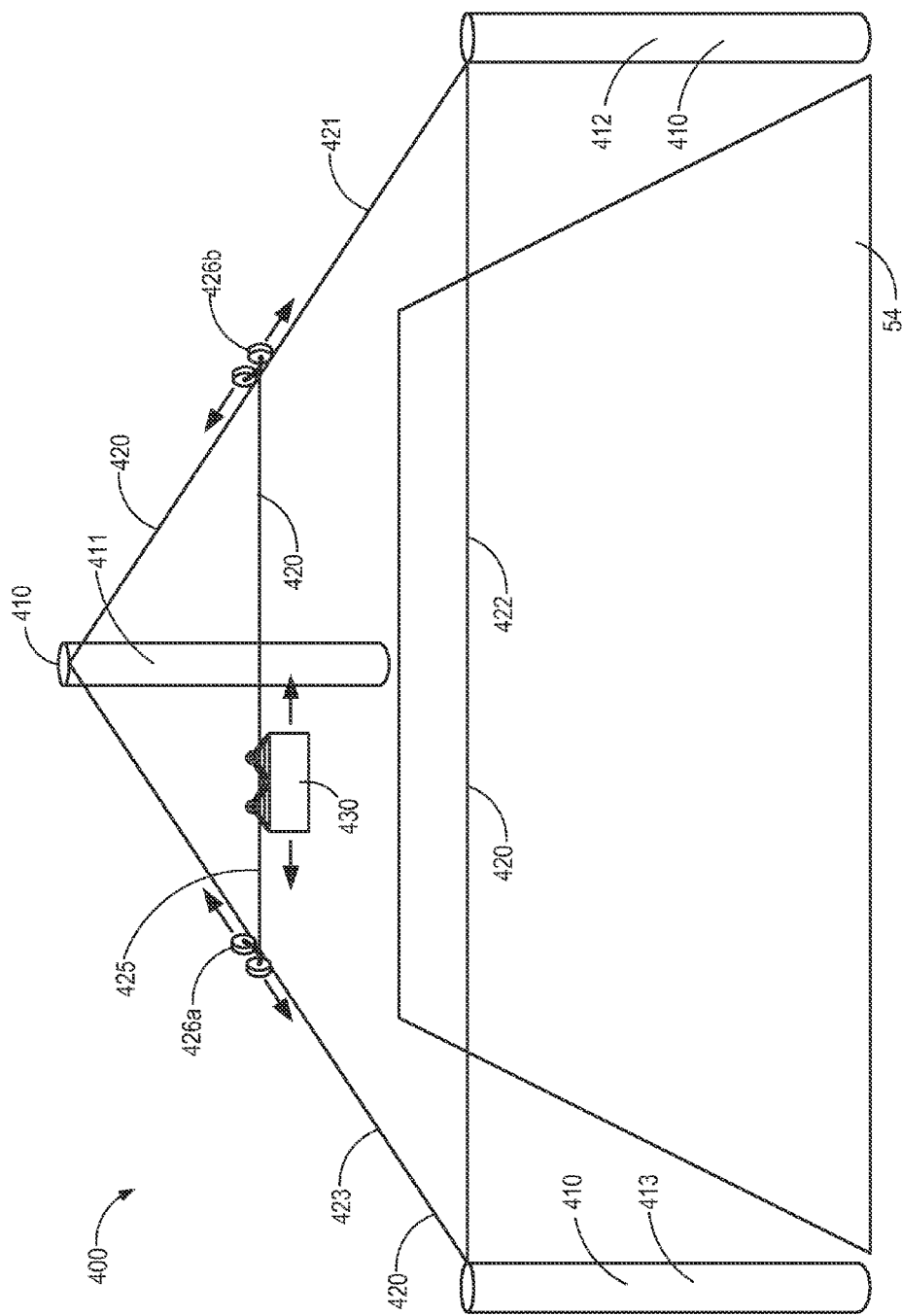
FIG. 6A is a schematic view of another embodiment of an agricultural access system having three vertical support members.

FIG. 6 is a schematic view of another embodiment of an agricultural access system 400 having three vertical support members 410. Specifically, the system 400 comprises a first vertical support member 411, a second vertical support member 412, and a third vertical support member 413. Each of these vertical support members 410 may be fixed to the ground. Any of the vertical support members 410 may be located either within or outside of agricultural field 54.

The system 400 further comprises three elevated lateral support members 420, a first elevated lateral support member 421, a second elevated lateral support member 422, and a third elevated lateral support member 423. The access component 430 of the system may be coupled to any or all of the elevated lateral support members 420 using any method or structure. In the illustrated embodiment, a moveable elevated lateral support member 425 is coupled to the first elevated lateral support member 421 and the third elevated lateral support member 423. The moveable elevated lateral support member 425 may be coupled at first 426*a* and second 426*b* ends such that the ends 426*a*, 426*b* may move along the lengths of the first 421 and third 423 elevated lateral support members, respectively. The movable elevated lateral support member 425 may comprise a length support member, and the access component 430 may be displaceable along the length of the movable elevated lateral support member 425. The ends 426*a* and 426*b* of the movable elevated lateral support member 425 may be displaceable along the length of the first 421 and third 423 elevated lateral supports or the first 421 and third 423 elevated lateral support members may comprise segments which may be adjusted analogously to the propulsion system disclosed in connection with FIG. 3. Again, any method of coupling or displacing a component along a member disclosed herein may be used to couple or displace another movable component along a member.

Figure 6B:
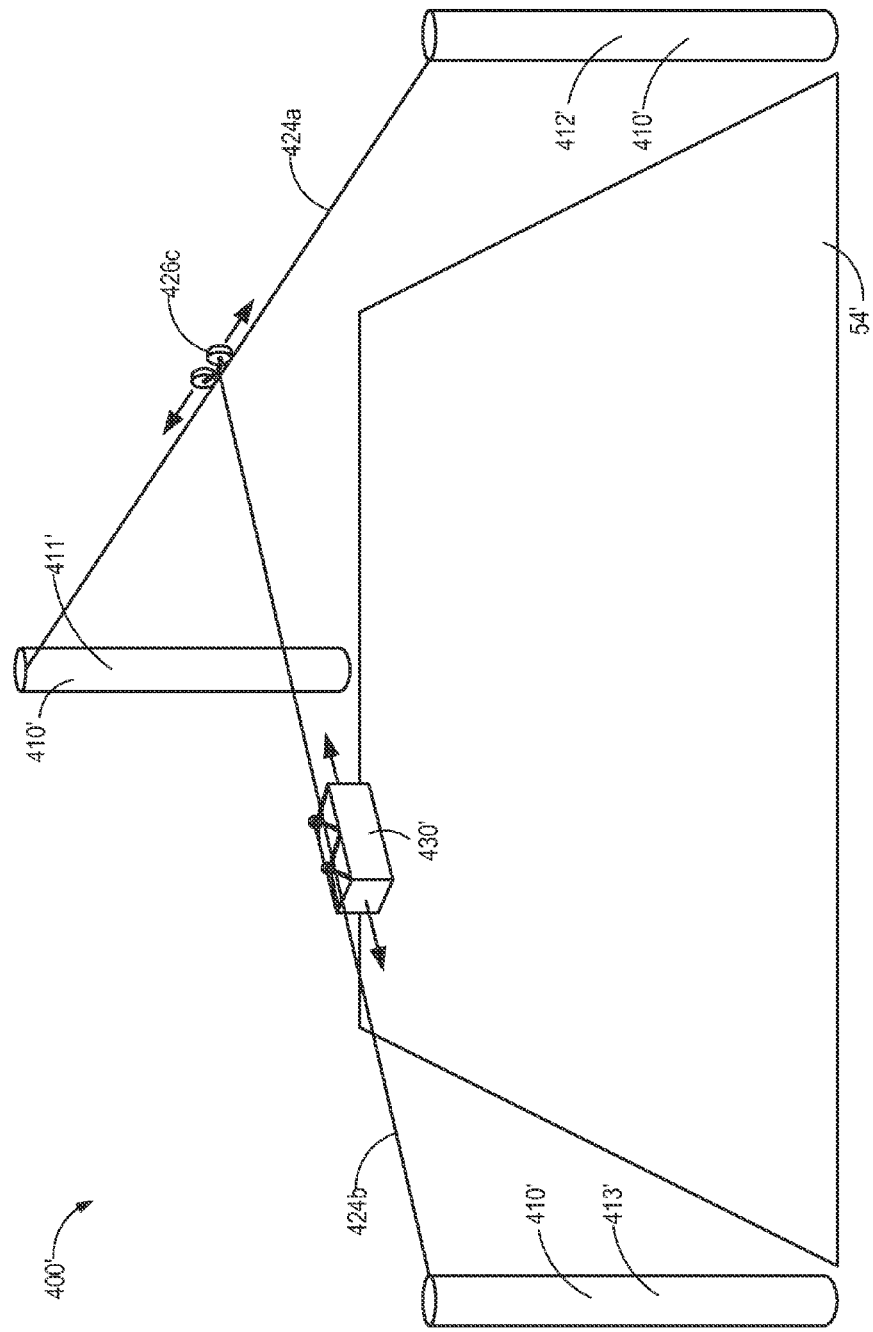
FIG. 6B is a schematic view of another embodiment of an agricultural access system having three vertical support members.

FIG. 6B is a schematic view of another embodiment of an agricultural access system 400' having three vertical support members 410'. In the illustrated embodiment, vertical support member 411' and vertical support member 412' are connected together via an elevated lateral support member 424*a*. A movable coupling component 426*c* may be displacable along elevated lateral support member 424*a*. Movable elevated lateral support member 424*b* is connected to movable coupling component 426*c* and to vertical support member 413'. Access component 430' may be displaceable along the length of the movable elevated lateral support member 424*b*. The movable coupling component 426*c* may be displaceable along the length of the elevated lateral support member 424*a* or the elevated lateral support member 424*a* may comprise segments which may be adjusted analogously to the propulsion system disclosed in connection with FIG. 3. The access component 430' may be displaceable along the length of the movable elevated lateral support member 424*b* or the elevated lateral support member 424*b* may comprise segments which may be adjusted analogously to the propulsion system disclosed in connection with FIG. 3. A field 54', is also shown in FIG. 6B.

FIG. 6C is a schematic view of another embodiment of an agricultural access system 400" having three vertical support members 410". In this embodiment, access component 430" is coupled to three lateral support members 420", each of which is coupled at its other end to a respective one of the vertical support members 410". Accordingly, a first end of lateral support member 421" is coupled to access component 430", while a second end of lateral support member 421" is coupled to vertical support member 411". A first end of lateral support member 422" is coupled to access component 430", while a second end of lateral support member 422" is coupled to vertical support member 412". A first end of lateral support member 423" is coupled to access component 430", while a second end of lateral support member 423" is coupled to vertical support member 413". Propulsion systems can be used, analogously to those disclosed in connection with FIG. 3, to vary the lengths of one or more of the lateral support members 421", 422", 423" in order to adjust the position of access component 430". A field 54" is also shown in FIG. 6C. Variants of this embodiment can be used for systems having 4, 5, or more vertical support members, in order to move access component 430" within quadrilateral or more general polygonal regions of an agricultural field.

Referring generally to the Figures above, any of the coupling systems, propulsion systems, reels, winches, access components, control systems, and other system components disclosed herein may be used with any embodiment herein. For example, any of the disclosure given in connection with FIG. 6 relative to support members, cables, and movement control may be utilized such that the access component 430 is displaceable within a three dimensional field of motion boarded by the elevated lateral supports 420, and extending from the tops of the vertical support members 410 to the field 54 or below the field 54 for access components 430 configured to penetrate the ground.

Again, any of the specific features of access components and/or control systems and related functions disclosed herein in connection with any single embodiment may be analogously applied to any other embodiment. Thus the features of the control system and access components of FIGS. 1-5 may be applied to the system of FIG. 6.

Systems within the scope of this disclosure may comprise a plurality of vertical support members, a plurality of elevated lateral support members (including movable elevated lateral support members), and access components to create a system wherein one or more access members are displaceable within a three dimensional area defined by the system. Any number of members creating various polygons or shapes are within the scope of this disclosure.

Figure 7:
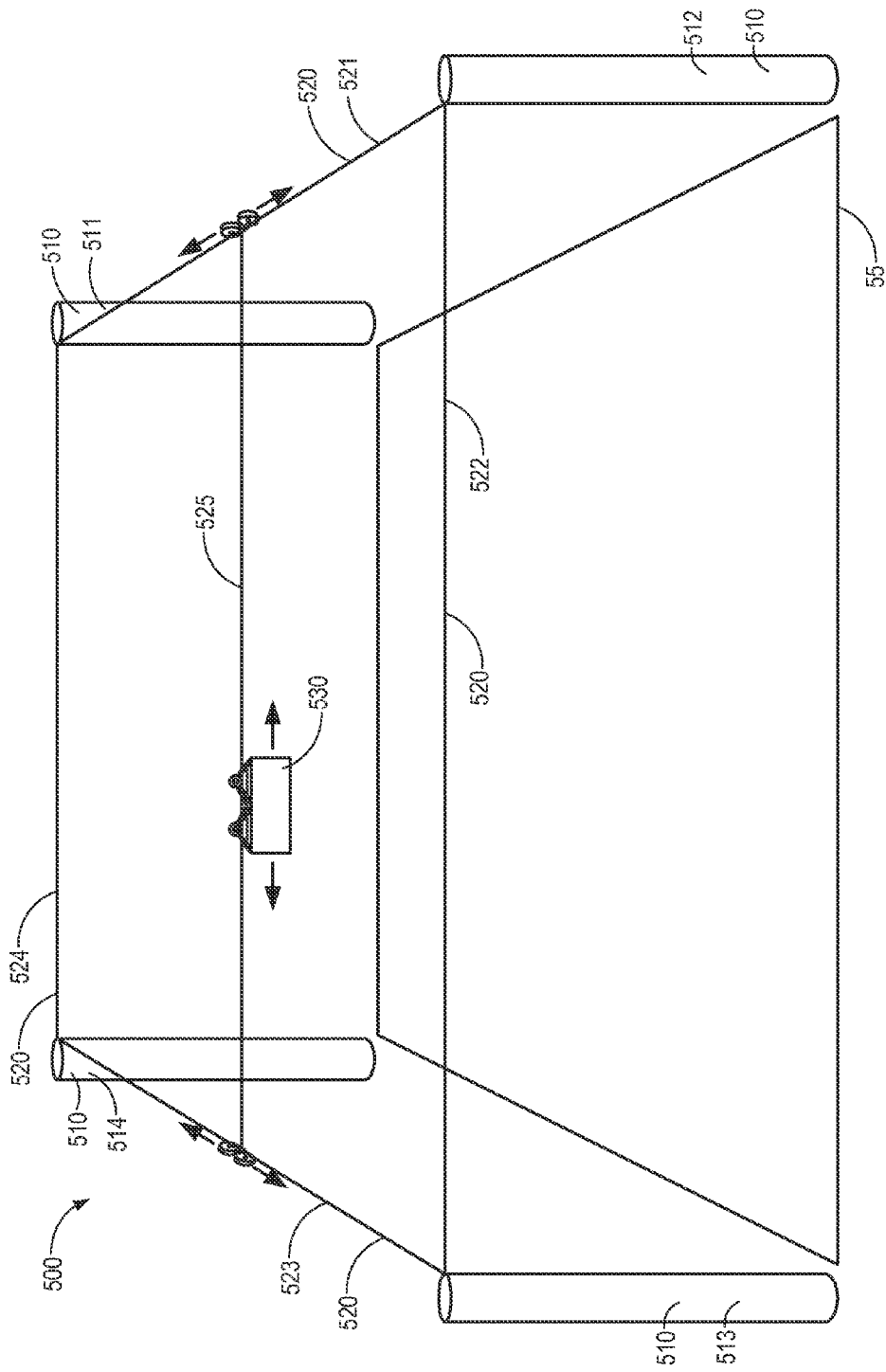
FIG. 7 is a schematic view of another embodiment of an agricultural access system having four vertical support members.

FIG. 7 is a schematic view of another embodiment of an agricultural access system 500 having four vertical support members 510. Specifically, the system 500 comprises a first vertical support member 511, a second vertical support member 512, a third vertical support member 513, and a fourth vertical support member 514. The system 500 further comprises elevated lateral support members 520, including a first elevated lateral support member 521, a second elevated lateral support member 522, a third elevated lateral support member 523, a fourth elevated lateral support member 524, and a movable elevated lateral support member 525. It is within the scope of this disclosure to configure any of these elevated lateral support members, using any method or structure, such that ends of the movable elevated lateral support members are displaceable along coupled elevated lateral support members and such that the access component 530 is displaceable within a field of motion defined by the system 500. A field 55 is also shown in this view.

Figure 8:
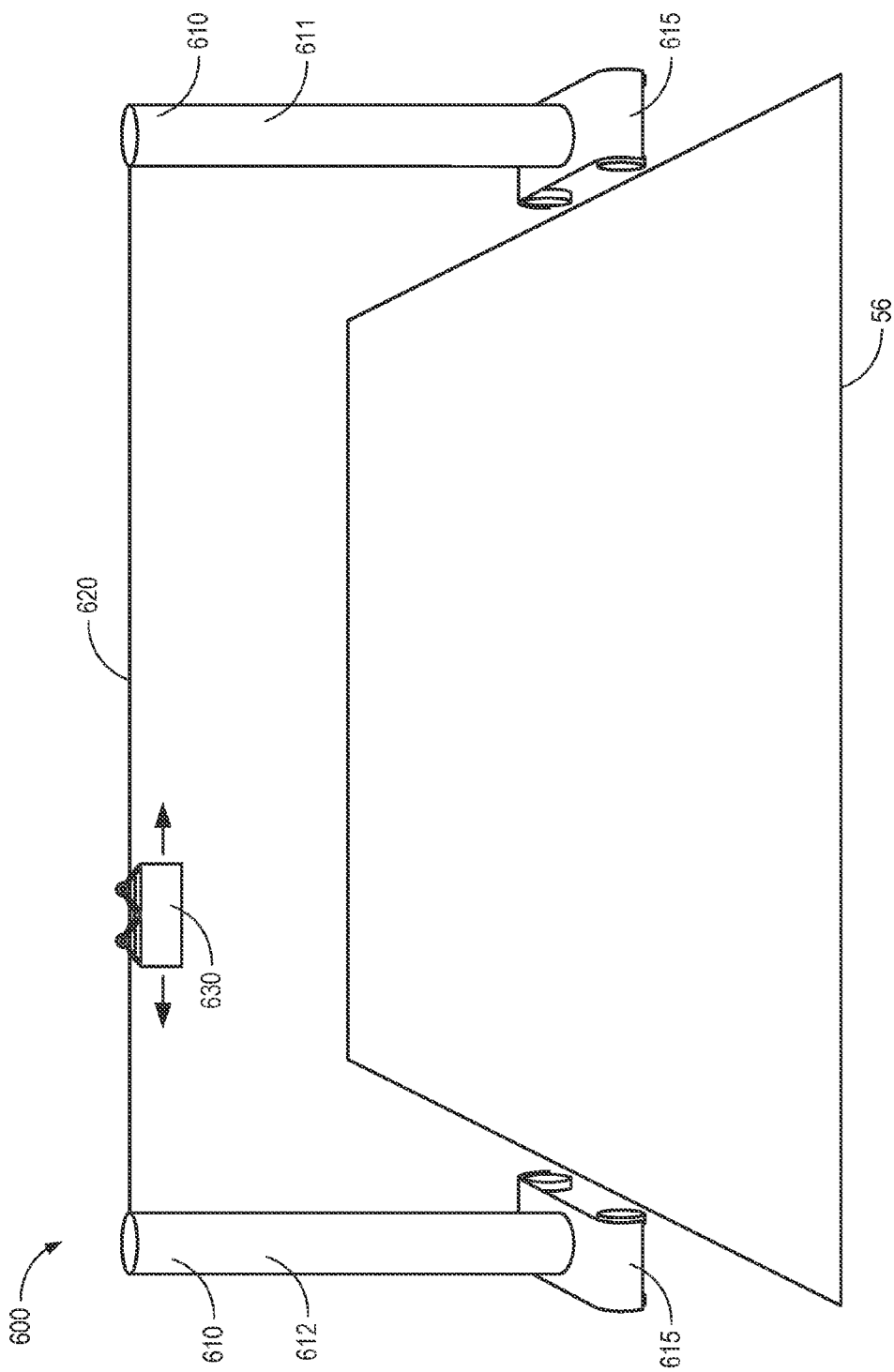
FIG. 8 is a schematic view of another embodiment of an agricultural access system having two movable vertical support members.

FIG. 8 is a schematic view of another embodiment of an agricultural access system 600 having two movable vertical support members 610. Specifically, the system 600 comprises a first movable vertical support member 611, a second movable vertical support member 612, an elevated lateral support member 620 extending between the movable vertical support members 610, and an access component 630. A field 56 is also illustrated. Any of the disclosure relative to any other embodiment, including design and function of control systems, access components, numbers of vertical and/or lateral support elements, and so forth may be analogously applied to systems comprising movable support members 610.

In the illustrated embodiment, the movable vertical support members 610 are each coupled to movement systems 615. These movement systems 615 may comprise track drives, wheels, tracks, rollers, shoes, skids, and so forth. The movement systems 615 may be configured to be moved along a predetermined path, including movement systems configured to be moved along rails. The movement systems 615 may be self-power or configured to be towed by a separate power source.

The movement systems 615 may be configured to position the agricultural access system 600 prior to use, or to move during use such that the field of motion of the access component 630 is moveable as the vertical support members 610 are displaced. Thus, the field of motion of the access component may thus be defined as a three dimensional area bounded by the vertical support members 610, including areas into which the vertical support members 610 may be moved by the movement systems 615.

Systems having any number of vertical support members 610 and/or elevated lateral support members 620 may be configured with one or more movement systems 615. In some embodiments, some vertical support members 610 may be movable while other vertical support members 610 within the same system may be fixed to the ground. Thus, one vertical support member 610 may be configured to translate with respect to another. For example, a system having two vertical support members, one of which is fixed and one movable, may be configured such that the movable vertical support member translates in a generally circular path around the fixed vertical support member.

Systems having more than one movable vertical support member may be configured such that each movable vertical support member is independently movable. Further, a control system configured to control other aspects of the system may also be configured to control the movement of the movable vertical support members. In other embodiments, the control of the movable vertical support members may be independent from a control system configured to control other elements of the system.

Figure 9:
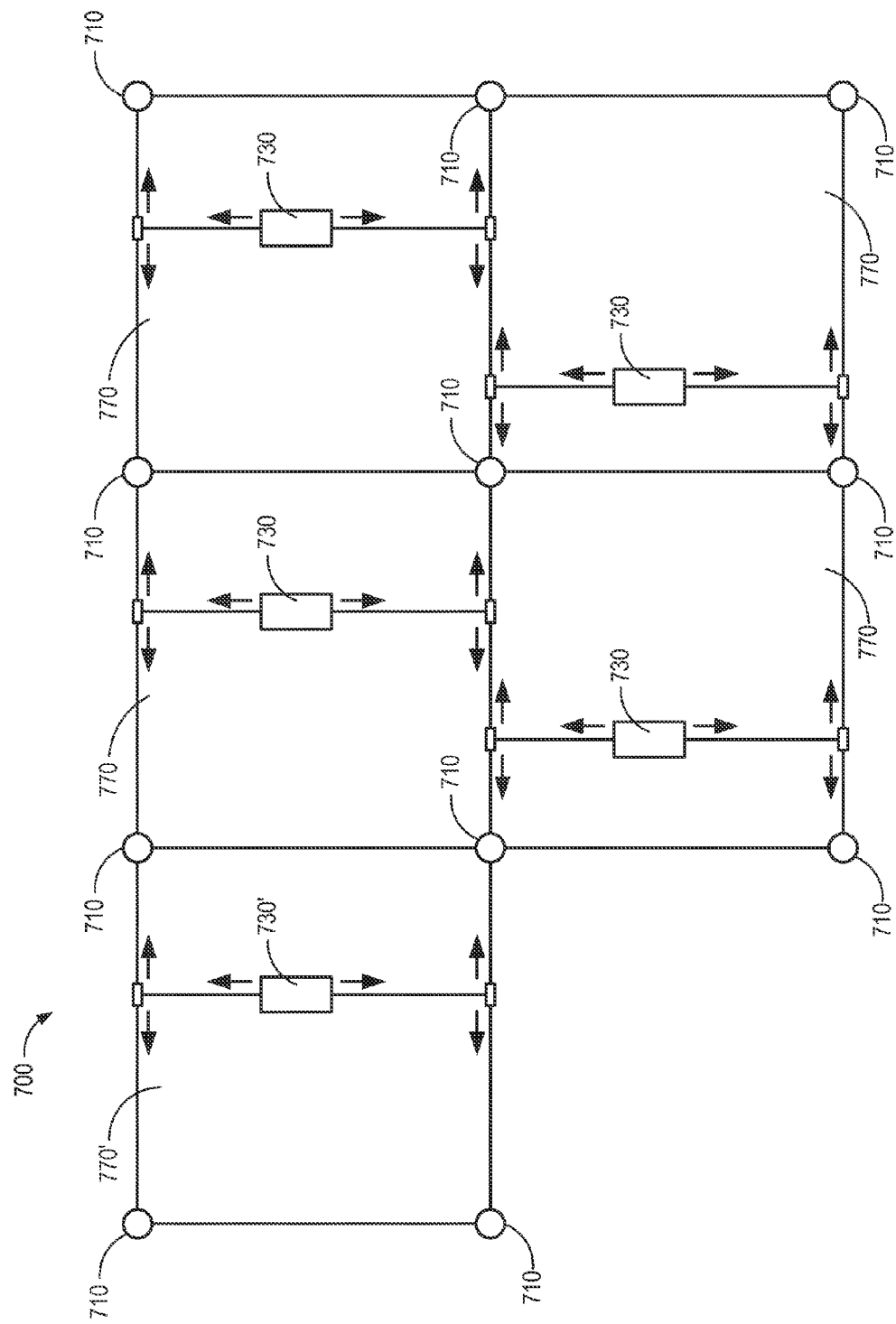
FIG. 9 is a top schematic view of another embodiment of an agricultural access system having a plurality of cells and access components.

FIG. 9 is a top schematic view of another embodiment of an agricultural access system 700 having a plurality of cells 770 and access components 730. A plurality of vertical support members 710 may be used in connection with any number of elevated lateral support members, including movable lateral support members, to define the cells 770. Each cell 770 may be associated with an access component 730 displaceable within the associated cell 770. Any of the coupling systems, propulsion systems, access components and functions, control systems and functions, and so on for the disclosed herein is analogously applicable to embodiments having a plurality of cells.

The various access components 730 may be configured to cooperatively manage a field. In some instances, adjacent access components 730 may be configured to pass tools, items for removal such as weeds or vermin, or other items from one access component 730 to another. A single control system may be configured to operate each of the access components and coordinate passing of materials from one access component to another.

Some systems comprising multiple cells may further define a tool storage cell, 770', which may be associated with an access component 730' configured to access the tool storage area. Such a design may facilitate tool storage within the field of motion of the entire system without placing stored tools within the planted area of the system. The access component 730' associated with the tool storage area may retrieve a tool which may be passed from various adjacent access components 730 until it is coupled to a desired access component 730. In this way, a single tool storage area may be utilized by multiple access components 730, even if each access component does not have a field of motion which reaches the tool storage area.

Some systems comprising multiple cells may comprise one or move movable vertical support members. Access components in the system may interact as the movable vertical support members translate to allow interaction between a first access component and an access component of another cell.

Various methods of accessing an agricultural area are also within the scope of this disclosure. Specifically, methods of accessing an agricultural area using any of the concepts, systems, or components disclosed herein are within the scope of this disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art, having the benefit of this disclosure, that changes may be made to the details of the above-described embodiments without departing from the underlying principles of the disclosure herein.

The invention claimed is:

1. An agricultural access system, comprising:
   a first vertical support member fixed to the ground;
   a second vertical support member fixed to the ground;
   an elevated lateral support member coupled to the first vertical support member and to the second vertical support member, the elevated lateral support member configured to extend over a portion of an agricultural field, wherein the lateral support member comprises a cable coupled to, and extending between, the first and second vertical support members;
   an agricultural access component coupled to the lateral support member such that the access component may be positioned at two or more locations between the first vertical support member and the second vertical support member; wherein the cable comprises a first segment coupled to the access component and to the first vertical support member and a second segment coupled to the access component and the second vertical support member; and
   a propulsion system configured to vary at least one of: the length of a portion of the first segment extending between the access component and the first vertical support member and the length of a portion of the second segment extending between the access component and the second vertical support member.

2. The agricultural access system of claim 1, wherein the access component is movable in a substantially horizontal direction along the lateral support member.

3. The agricultural access system of claim 2, wherein a portion of the access component is movable in a substantially vertical direction, away from the lateral support member, the vertical direction substantially orthogonal to the horizontal direction.

4. The agricultural access system of claim 3, wherein the access component comprises:
   a coupling portion coupled to the lateral support member, the coupling portion displaceable along a length of the lateral support member, and an extension portion configured to be displaceable from the coupling component in the vertical direction.

5. The agricultural access system of claim 1, wherein the access component is configured to deliver material.

6. The agricultural access system of claim 5, further comprising a conduit coupled to the access component, the conduit configured to deliver the material.

7. An agricultural access system, comprising:
a first vertical support member fixed to the ground;
a second vertical support member fixed to the ground;
a third vertical support member fixed to the ground;
a first elevated lateral support member coupled to the first vertical support member;
a second elevated lateral support member coupled to the second vertical support member;
a third elevated lateral support member coupled to the third vertical support member; and
an agricultural access component coupled to at least one of the lateral support members such that the access component may be positioned at two or more locations between the first, second, and third vertical support members
wherein a first end of the first lateral support member is coupled to the first vertical support member such that the first end of the first lateral support member is displaceable along a portion of the first vertical support member, a first end of the second lateral support member is coupled to the second vertical support member such that the first end of the second lateral support member is displaceable along a portion of the second vertical support member, and a first end of the third lateral support member is coupled to the third vertical support member such that the first end of the third lateral support member is displaceable along a portion of the third vertical support member.

8. The agricultural access system of claim 7, wherein the first lateral support member and the second lateral support member are coupled to a movable coupling component, such that the movable coupling component may be positioned at two or more positions between the first vertical support member and the second vertical support member; and further comprising a fourth elevated lateral support member coupled to the movable coupling component.

9. The agricultural access system of claim 8, wherein the fourth lateral support member forms a first portion of a movable lateral support member, the third lateral support member forms a second portion of the movable lateral support member, and the access component comprises a second propulsion system configured to move the access component along the movable lateral support.

10. The agricultural access system of claim 9, wherein the movable support member comprises a cable.

11. The agricultural access system of claim 8, wherein a first end of the fourth lateral support member is coupled to the movable coupling component, a second end of the fourth lateral support member is coupled to the access component, a first end of the third lateral support member is coupled to the third vertical support member, and a second end of the third lateral support member is coupled to the access component.

12. The agricultural access system of claim 11, further comprising a second propulsion system configured to vary at least one of the length of a portion of the fourth lateral support member extending between the movable coupling component and the access component and a length of a portion of the third lateral support member extending between the access component and the third vertical support member.

13. The agricultural access system of claim 7, wherein the first lateral support member is coupled to the access component, the second lateral support member is coupled to the access component, and the third lateral support member is coupled to the access component.

14. The agricultural access system of claim 7, further comprising:
a fourth vertical support member fixed to the ground; and
a fourth elevated lateral support member coupled to the fourth vertical support member;
wherein the agricultural access component is coupled to at least one of the lateral support members such that the access component may be positioned at two or more locations between the four vertical support members.

15. An agricultural access system, comprising:
a plurality of vertical support members fixed to the ground;
a plurality of elevated lateral support members each coupled to a corresponding vertical support member of the plurality of vertical support members; and
an agricultural access component coupled to at least one of the lateral support members;
the access system configured such that the access component is displaceable within a portion of a polygon defined by the plurality of vertical supports;
wherein a portion of the access component is movable in a substantially vertical direction, away from the later support members.

16. The agricultural access system of claim 15, further comprising a control system configured to control the position of the access component within a field of motion of the access component.

17. The agricultural access system of claim 16, wherein the control system communicates between components on board the access component and remote components.

18. The agricultural access system of claim 16, further comprising one or more sensors configured to detect conditions or features within a field of regard of the access component.

19. The agricultural access system of claim 18, wherein the field of regard comprises a field of motion of the access component.

20. The agricultural access system of claim 18, further comprising a communications transmitter configured to deliver data signals from at least one sensor to an external site.

21. An agricultural access system, comprising:
a plurality of vertical support members fixed to the ground, the plurality of vertical support members defining a plurality of adjacent cells;
a plurality of elevated lateral support members operably coupled to the plurality of vertical support members; and
a plurality of agricultural access components, each access component operably coupled to at least one lateral support member;
the agricultural access system configured such that at least one access component is displaceable within a portion of each cell of the system;
wherein the access components are configured to interact with access components of adjacent cells of the system.

22. The agricultural access system of claim 21, wherein the access components are configured to pass tools to adjacent access components.

23. The agricultural access system of claim 21, further comprising one or more dampening components.

24. The agricultural access system of claim 23, wherein at least one dampening component is actively controlled.

25. An agricultural access system, comprising:
a plurality of vertical support members fixed to the ground;
a plurality of elevated lateral support members each coupled to a corresponding vertical support member of the plurality of vertical support members;
an agricultural access component coupled to a first lateral support member of the plurality of lateral support members, the first lateral support member comprising a first cable segment coupled to the access compontent and a first vertical support member of the plurality of vertical support members and a second cable segment coupled to the access component and a second vertical support member of the plurality of vertical support members; and
a propulsion system configured to vary at least one of: a portion of the length of the first cable segment and a portion of the length of the second cable segment.

the access system configured such that the access component is displaceable within a portion of a polygon defined by the plurality of vertical support members.

26. The agricultural access system of claim 25, further comprising a control system configured to control the position of the access component within the portion of the polygon.

27. The agricultural access system of claim 26, wherein the control system communicates between components on board the access component and remote components.

28. The agricultural access system of claim 26, further comprising one or more sensors configured to detect conditions or features within a field of regard of the access component.

29. The agricultural access system of claim 28, wherein the field of regard comprises the portion of the polygon.

* * * * *

UNITED STATES PATENT AND TRADEMARK OFFICE
CERTIFICATE OF CORRECTION

PATENT NO. : 9,295,192 B2  
APPLICATION NO. : 14/061574  
DATED : March 29, 2016  
INVENTOR(S) : William David Duncan, Roderick A. Hyde and Lowell L. Wood, Jr.

Page 1 of 1

It is certified that error appears in the above-identified patent and that said Letters Patent is hereby corrected as shown below:

Claims

Column 16, lines 27-28, claim 15:
"away from the later supports." should read --away from the lateral supports.--

Column 17, lines 13-14, claim 25:
"plurality of vertical support members; and" should read --plurality of vertical support members;--

Column 17, line 17, claim 25:
"portion of the length of the second cable segment." should read --portion of the length of the second cable segment; and--

Signed and Sealed this
Nineteenth Day of July, 2016

Michelle K. Lee
*Director of the United States Patent and Trademark Office*